144. WOOD-WORKING.
Wood Bending,
Former,
Pivotal.
267
T. Blanchard,
Bending Wood.
No. 853. Reissued Nov. 15, 1859.
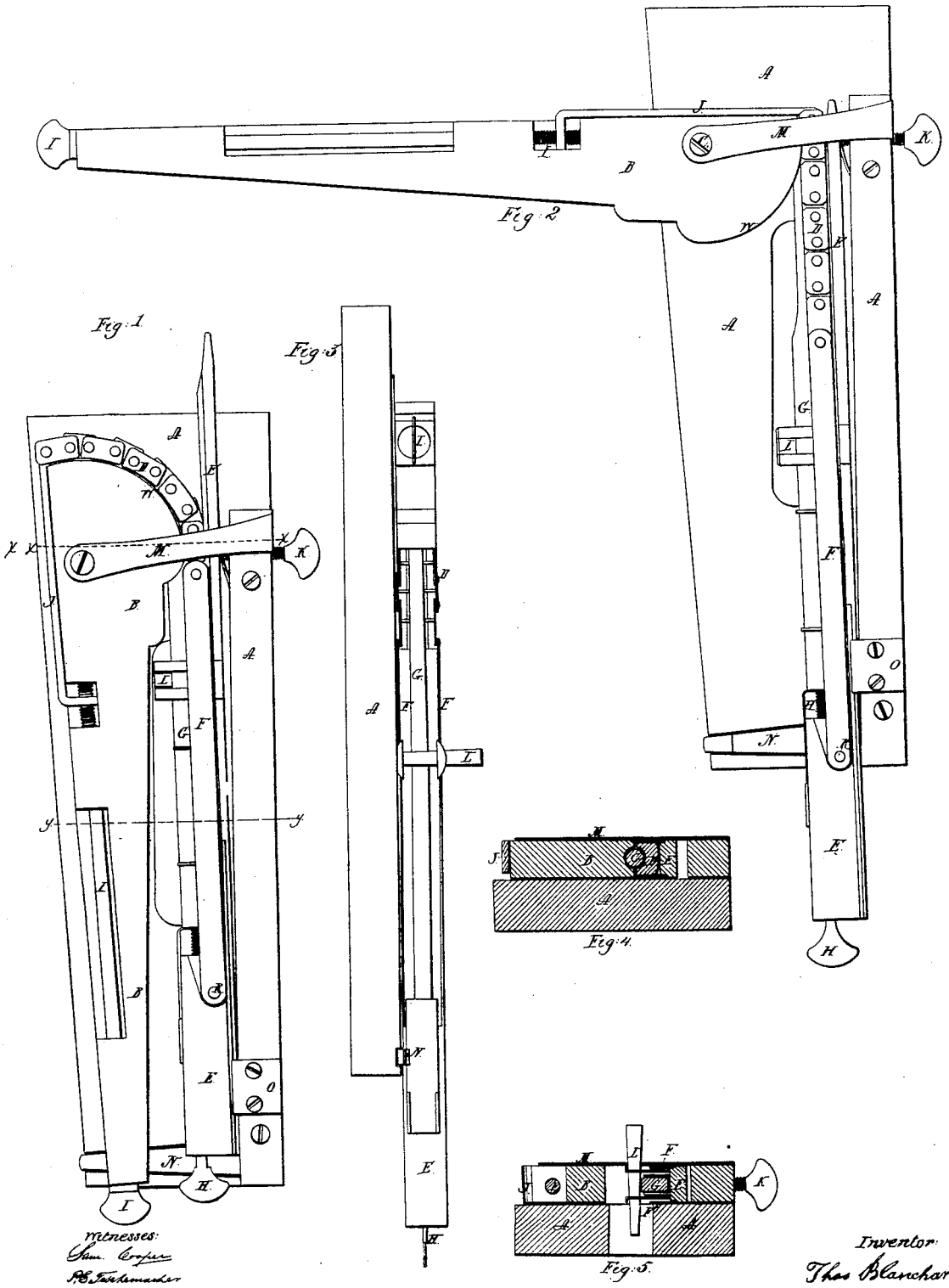
Witnesses:
Sam. Cooper
P.B. Tuckermander
Inventor:
Thos Blanchard.
AM. PHOTO-LITHO. CO. N.Y. (OSBORNE'S PROCESS)

UNITED STATES PATENT OFFICE.

THOMAS BLANCHARD, OF BOSTON, MASSACHUSETTS.

IMPROVEMENT IN BENDING WOOD.

Specification forming part of Letters Patent No. 6,951, dated December 18, 1849; Reissue No. 853, dated November 15, 1859.

*To all whom it may concern:*

Be it known that I, THOMAS BLANCHARD, of Boston, in the county of Suffolk and State of Massachusetts, have invented a new and Improved method of Bending Wood; of which the following is a full, clear, and exact description, reference being had to the accompanying drawings, making part of this specification, in which—

Figure 1 is a top view of the machine with the mold lever brought home to its place after the operation of bending is completed; Fig. 2, a top view with the mold-lever thrown open to receive the timber previous to bending; Fig. 3, a side view of the sliding beam E and bench A; Fig. 4, a transverse section upon the line *x x* of Fig. 1; Fig. 5, a transverse section upon the line *y y* of Fig. 1.

In the machines heretofore contrived for the purpose of bending timber the bed-piece upon which the stick was placed and the lever by which the bending was effected have not been so connected together as to hold them at fixed distances from each other, and consequently, when the piece of timber being bent was of varying stiffness or when it contained knots, it was liable to rise up and leave the mold wherever there was a weak place in the stick; and, if the first of the operation was successful and the part bent was followed by a stiffer portion, the former was liable to be thrown out of place by the more rigid and unyielding portion, and thus an imperfect curve was the result, and these difficulties were not remedied by the employment of flexible bands of metal or other devices intended to prevent the breaking of the timber on the outside of the bend.

The above-mentioned difficulties were in most cases enhanced, if not caused, to a considerable extent by the fact that the power by which the timber was bent was applied to the timber itself as a means of communicating the power to the parts to be bent, while in the improvements to be hereinafter described the timber is passive, and the bending is effected by power applied through the mechanism employed. These machines were also defective in another particular. If the attempt should be made in them to apply any considerable pressure to the end of the timber to be bent, instead of consolidating the material and causing the fiber thereof to be condensed such pressure would only increase the tendency to bulge up the timber from the mold and break it. All these difficulties have been remedied by my improved method of bending, which I will now proceed more particularly to describe.

The machine represented in the accompanying drawings is designed for bending plow-handles, but it is obvious that the details of the machinery must be varied when the invention is applied to bending other articles having different forms.

B is the mold or lever by which the bending is effected, and which is pivoted at C to the bed-plate A, which, together with the flange $A^2$, composes the bench to which the operating parts are secured. The pivot C is sustained and prevented from being bent or thrown out of position by the strain brought upon it in the act of bending by a strap, M, which passes over and is secured to the bed-plate. The lever B is of a length corresponding to the power required, and is curved upon its inner end to suit the bend to be given to the handle, this curve W being struck from the pivot C as a center. The piece of timber to be bent is carried by the sliding beam E, which moves longitudinally upon the bed-plate, and is connected with the mold or bending lever B as follows: D is a chain the links of which, as well as the curved end of the mold B, are formed to correspond with the size and shape of the handle, as seen in section in Fig. 4. The chain is connected at one end to a sliding bar, J, upon one side of the mold-lever B, and at the other by means of the long straps F with the sliding beam E by a joint-pin, R. The straps F are a sufficient distance apart to permit the handle G to lie between them, and are connected by a pin to the last link of the chain, one on each side.

H is the upsetting-screw, which passes through the end of the sliding beam E and comes in contact with the end of the handle G at *x*. By means of this screw the requisite pressure is put upon the end of the stick to condense the fibers upon the inside of the curve as well as to prevent those upon the outside from separating while bending. This end-pressure also compels the stick to keep up to the end of the mold, and thus perfect the bend at the end of the stick as well as at other points.

I is a draft-screw running longitudinally through the mold-lever and entering a female screw in one end of the sliding bar J. The other end of this bar is connected with the last link of the chain, and by means of the screw the extreme end of the plow-handle is gripped between the last link of the chain and the mold B. Handles of various sizes may thus be bent in the same machine.

By means of the set-screw K passing through the flange $A^2$ on one side of the bench the sliding beam E is borne up against the outside of the chain at the bending-point, and thus the chain and sliding beam are kept at the required distance from the mold-lever to allow the article being bent to lie between them.

O is a clamp, made fast to the top of the flange by two screws. One end of this clamp is bent down in the form of a hook, that falls into a groove on the top of the sliding beam, and serves to keep that end of the beam in its place, but allows it to slide freely.

The fulcrum-pin C, on which the lever B turns, is supported on top of the lever by a brace, M, as before explained, through which it passes into the bench. The other end of the brace extends across the bench over the sliding beam E, and is made fast to the stationary flange $A^2$.

By means of the key or wedge L the timber is held firm in its bed in the sliding beam, and is prevented from springing sidewise during the upsetting and bending process. The stick is furthermore steadied and held in place by pins *z* above and below it. Any number of these pins and wedges may be employed, according to the length and delicacy of the article being bent, or any other suitable devices may be employed for the purpose in their stead. After the lever B is brought down to its place, Fig. 1, it is held fast to one end of the bench by a spring-catch, N.

The operation of the machine is as follows: The mold-lever is thrown open at right angles with the bench, as shown in Fig. 2. The timber or handle G is placed with its rounded end between the chain and the mold and in contact with the bar J. The key L is then driven in, Fig. 5, to hold it in its place, but still allow it to slide endwise sufficient to upset. The draft-screw I is then turned to bring the end of the handle and end of the chain firm against the mold. The set-screw K is then turned up to bring the beam E against the back of the chain to give it proper support. The tender then applies his hand to the upsetting-screw H and turns it forward and presses the handle endwise, driving the rounded end firm against the slide J, which is connected with the first link of the chain. This operation tightens the chain and completes the preparations for the bending process. Power is then applied to bring the mold-lever round, which draws the sliding beam forward with the handle as the curve is formed, the upsetting-screw co-operating with the chain and mold-lever to keep the plow-handle up to the bar J, so as to insure the bend at the extreme end, while the fiber in the inner part of the curve is consolidated and that which forms the outer part of the curve is prevented from breaking. During the operation it is usually found necessary to relax the upsetting-screw a little to prevent the timber on the inside of the curve from crippling. When the mold-lever is brought home to its place, the spring-catch N takes hold of the end of the lever and prevents it from going back, and the work is completed. That part of the plow-handle which is bent is of an oval form, and is turned or wrought in proper shape before it is bent. It is formed deepest or thickest transversely to the curve, consequently the links or blocks that form the chain are made hollow to conform to the outside of the curve, the lever-mold having a corresponding hollow to fit the inside. The chain may be dispensed with in bending large curves with flat sides, such as fellies for wheels. Where the sides have flat surfaces a metallic strap may be substituted, and a number of pieces can be bent at once in the same mold, or a whole plank of suitable thickness may be bent at once and be sawed into fellies afterwards. In that case there would be no side twist or winding in the operation of bending, but if they are sawed into squares before being bent the wind or side crook may be prevented by placing a number together, and the side spring may be prevented by side clamps to keep them in the right direction while they are being bent. These side clamps may extend around the mold, which will prevent the side movement while receiving the proper curve. In lieu of the bending mould above described a drum may be used for a mould, and this drum may be either cylindrical or elliptical or of any figure required, and instead of actuating the mold by a lever, cog-wheels may be used and any species of power applied to drive the machine. The upsetting power must be given by the screw or other mechanical power when the timber is first placed in the mold and while in its straight form by screwing or pressing against the ends of the timber, and care should be taken to prevent its crippling by having clamps attached to the sliding bed. The amount of end-pressure should be sufficient to condense the fibers on the inside of the curve without crippling the timber and to prevent the fibers on the outside of the curve from being drawn apart. When the timber is in danger of being crippled by the end-pressure, which particularly occurs in short curves or where the stick is thick, the upsetting-screw should be relaxed gradually as the bending proceeds to a sufficient extent to relieve the timber of the excessive end-pressure and prevent the crippling, as before stated.

There are many mechanical methods by which the relaxation of the end-pressure can

United States Patent Office

PTO - BOYERS, PA Duty Station

MISSING PAGE TEMPORARY NOTICE

PATENT # RE853 FOR ISSUE DATE 11-15-1859

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p. 3 of text + rest.

N/A at Boyers 11-3-92.

Data Conversion Operation

Boyers, Pa